United States Patent [19]
Freed

[11] 3,901,846
[45] Aug. 26, 1975

[54] THERMOPLASTIC POLYOXYMETHYLENE MOLDING RESINS
[75] Inventor: William T. Freed, Madison, N.J.
[73] Assignee: Celanese Corporation, New York, N.Y.
[22] Filed: Aug. 12, 1974
[21] Appl. No.: 496,606

[52] U.S. Cl. ............................ 260/37 AL; 260/823
[51] Int. Cl.² ......................................... C08L 71/02
[58] Field of Search ............ 260/37 AL, 830 R, 823

[56] References Cited
UNITED STATES PATENTS
3,213,158  10/1965  Sakakibara et al. ............ 260/830 R
3,647,743  3/1972  Nagamatsu et al. ............ 260/37 AL
3,775,363  11/1973  Braunstein ..................... 260/37 AL Primary Examiner—Lewis T. Jacobs
Attorney, Agent, or Firm—Thomas J. Morgan; Linn I. Grim; Marvin Bressler

[57] ABSTRACT

An improved thermoplastic molding resin comprising intimately mixed polyoxymethylene polymers and reinforcing agents in the presence of a thermoplastic phenoxy resin.

10 Claims, No Drawings

THERMOPLASTIC POLYOXYMETHYLENE MOLDING RESINS

The present invention relates to the products and process for preparing improved thermoplastic molding resins. More specifically, this invention describes improved reinforced polyoxymethylene polymers.

Reinforced polyoxymethylene polymers as described in U.S. Pat. No. 3,455,867 provide increased strength properties in molded articles, however chemical coupling agents are required to provide these improvements. Thus, a chemical reaction is required and it is difficult to control this insitu reaction to obtain reproducible product. Usually the molded reinforced polyoxymethylene polymers have difficulties in providing smooth surface properties since the reinforcing agents tend to extend through the polymer surface. Even with these slight problems reinforced polyoxymethylene polymers are outstanding thermoplastic molding resins.

It has now been discovered that improved thermoplastic reinforced polyoxymethylene polymers are provided by the incorporation of small amounts of specific high molecular weight phenoxy resins in these compositions. The compositions of this invention not only provide improved physical properties but provide improved surface effects of the molded articles.

Oxymethylene polymers having recurring —$CH_2O$— units, have been known for many years. They may be prepared by the polymerization of anhydrous formaldehyde or by the polymerization of trioxane, which is a cyclic trimer of formaldehyde.

Thus, the oxymethylene copolymer used in carrying this invention into effect may be a polymer having a structure comprising recurring units represented by the general formula

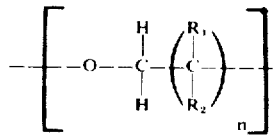

wherein each $R_1$ and $R_2$ is selected from the group consisting of hydrogen, lower alkyl and halogen-substituted lower alkyl radicals, and wherein $n$ is an integer from zero to three, inclusive, and $n$ being zero in from 85 to 99.9 mole percent of the recurring units. Each lower alkyl radical preferably has from one to two carbon atoms, inclusive.

The oxymethylene copolymers produced from the preferred cyclic ethers have a structure composed substantially of oxymethylene and oxyethylene groups in a ratio of from about 6 to 1 to about 1,000 to 1.

The oxymethylene copolymers described briefly above are members of the broader group of such copolymers that are useful in practicing the present invention and which have at least one chain containing recurring oxymethylene units interspersed with —OR— groups in the main polymer chain. In such —OR— groups, R represents a divalent radical containing at least two carbon atoms linked directly to each other and positioned in the polymer chain between the two valences with any substituents on said radical being inert, that is, substituents that are free from interfering functional groups and do not induce undesirable reactions under the conditions involved.

Among such copolymers that advantageously may be employed in practicing this invention are oxymethylene copolymers containing from about 60 mole percent to 99.9 mole percent of recurring oxymethylene groups to from 0.1 mole percent to about 40 mole percent of —OR— groups. As indicated hereinbefore, the most preferred copolymers are those having from about 85 mole percent to 99.9 mole percent of recurring oxymethylene groups and from about 0.1 to 15 mole percent of —OR— groups. In a preferred embodiment R may be, for example, an alkylene or substituted alkylene group containing at least two carbon atoms.

Also useful in carrying the instant invention into effect are oxymethylene copolymers having a structure comprising recurring units consisting essentially of those represented by the general formula

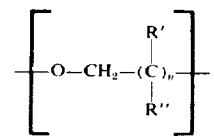

wherein $n$ represents an integer from 0 to 5, inclusive, and representing 0 (zero) in from 60 to 99.6 mole percent of the recurring units; and $R'$ and $R''$ represent inert substituents, that is, substituents which are free from interfering functional groups and will not induce undesirable reactions. Thus, one advantageously may utilize oxymethylene copolymers having a structure comprising oxymethylene and oxyethylene recurring units wherein from 60 to 99.9 mole percent of the recurring units are oxymethylene units.

It has previously been indicated that especially preferred copolymers employed in practicing the present invention are those containing in their molecular structure oxyalkylene units having adjacent carbon atoms which are derived from cyclic ether having adjacent carbon atoms. Such copolymers may be prepared by copolymerizing trioxane or formaldehyde with a cyclic ether represented by the general formula

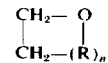

wherein $n$ represents an integer from zero to 4, inclusive, and R represents a divalent radical selected from the group consisting of (a) $CH_2$, (b)$CH_2O$, and (c) any combination of $CH_2$ and $CH_2O$.

Examples of specific cyclic ethers that may be used in preparing copolymers of this invention include cyclic ethers, 1,3,5-trioxepane, 1,3-dioxepane, betapropiolactone, gamma-butyrolactone, neopentyl formal, pentaerythritol diformal, paraldehyde, and butadiene monoxide. In addition, glycols including, for example, ethylene glycol, diethylene glycol, 1,3-butylene glycol, propylene glycol and the like, may be employed instead of the cyclic ethers, acetals and esters just mentioned.

Although formaldehyde is a desirable source of the oxymethylene moiety (i.e., $R_2O$ wherein $R_2$ represents methylene or substituted methylene), it will be understood, of course, by those skilled in the art that instead of formaldehyde, other sources of the oxymethylene moiety may be used; e.g., paraformaldehyde, trioxane, acetaldehyde, propionaldehyde, and the like. One may also employ cyclic acetals, e.g., 1,3,5-trioxepane, in lieu of both the cyclic ether and formaldehyde.

As used in the specification and claims, the term "oxymethylene polymers" denotes homopolymers and copolymers (including terpolymers, etc.) having at least 60 percent recurring oxymethylene units, and further includes substituted oxymethylene polymers, wherein the substituents are inert, i.e., do not participate in undesirable side reactions.

Also, as used in the specification and claims of this application, the term "copolymer" means polymers obtained by the copolymerization of two or more different monomers (i.e., polymers containing in their molecular structure two or more different monomer units), and includes terpolymers, tetrapolymers and high multicomponent polymers. The term "polymer" (unless it is clear from the context that the homopolymer or a copolymer is intended) includes within its meaning both homopolymers and copolymers.

that of epoxy resins. They are, however, a separate and unique resin class, differing from epoxies in several important characteristics:

1. Phenoxy resins are tough and ductile thermoplastics. Their average molecular weight ranges from 15,000 to 75,000 preferably from 20,000 to 50,000 compared with 340 to 13,000 for conventional epoxies which crosslink on polymerization.
2. Phenoxy resins do not have terminal highly reactive epoxy groups and are thermally stable materials with a long shelf life.
3. The phenoxy resins can be used without further chemical conversion. They require no catalysts, curing agents or hardeners to be useful products while epoxy resins require catalysts, curing agents or hardeners to be useful.

The phenoxy resins utilized herein can be characterized by a repeating structure:

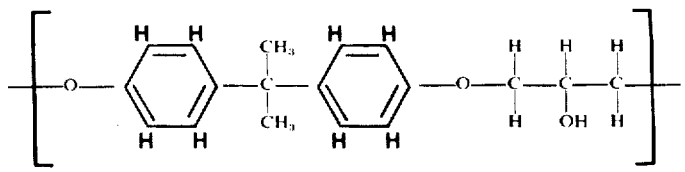

The oxymethylene polymers that are modified according to this invention are thermoplastic materials having a molecular weight of at least 5,000, a melting point of at least 100°C. and an inherent viscosity of at least 0.6 (measured at 60°C. in a 0.1 weight percent solution in p-chlorophenol containing 2 weight percent of alpha-pinene), preferably they have a molecular weight of at least 10,000, a melting point of at least 150°C. and an inherent viscosity of at least 1.0 (measured at 60°C. in a 0.1 weight percent solution in p-chlorophenol containing 2 weight percent of alpha-pinene).

The oxymethylene polymer component used in this invention may be, if desired, oxymethylene polymers that have been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in Canadian Pat. No. 725,734 issued to Frank M. Berardinelli on Jan. 11, 1966, assigned to the same assignee as the present invention, and by this cross-reference is made a part of the disclosure of the instant application.

While up to as much as 100 percent of the polymeric chains of the oxymethylene polymers may contain terminal hydroxymethyl or hydroxyalkyl groups (i.e., hydroxy bonded to methylene or higher alkylene groups) the oxymethylene polymers may also contain active hydrogen-containing groups bonded to or adjacent copolymeric units derived from the comonomers described above and in the aforementioned article by Kern et al.

The phenoxy resins utilized herein are high molecular weight thermoplastic resins which are produced from 2,2-bis (4-hydroxyphenyl) propane and epichlorohydrin according to the procedure as described in U.S. Pat. No. 3,356,646 issued Dec. 5, 1967. The basic chemical structure of the phenoxy resins is similar to and having an average molecular weight range from about 15,000 to 75,000. As is obvious, the terminal structure is completed with hydrogen atoms or some suitable end capping groups.

The thermoplastic phenoxy resin can be added to the reinforced oxymethylene resin in a number of ways (1) by incorporating the phenoxy resin onto the reinforcing agent prior to its intimate blending with the oxymethylene resins, (2) by simultaneously intimately mixing with the reinforcing agent and the oxymethylene resins and (3) by blending with the polymer and intimately blending with the reinforcing agents. Other mixing techniques can be used.

The amount of phenoxy resin incorporated can range from about 0.1 to about 8 weight percent preferably from about 0.5 to about 3 weight percent of the total thermoplastic oxymethylene molding resin.

The reinforcing agents as utilized herein which provide increased strength to the molded product can be intimately mixed by either dry blending or melt blending, blended in extruders, heated rolls or other types of mixers. If desired, the reinforcing agents can be blended with the monomers in the polymerization reaction as long as the polymerization reaction is not affected. The type of fillers which can be used include among others, glass fibers (chopped or continuous rovings), asbestos fibers, cellulosic fibers, synthetic fibers, including graphite fibers, acicular calcium metasilicate and the like. The amount of reinforcing agent can range from about 2 to about 60 weight percent, preferably 5 to 60 weight percent based on the total molding composition.

The following examples will serve to illustrate the invention without limiting the same.

EXAMPLES

Polyoxymethylene copolymers (ethylene oxide) having number average molecular weight of 35,000 was tumble blended with glass fibers (⅛ inch length) and then extrusion blended by force feeding through a 1 inch single screw extruder with a strand die. The temperatures of the extruder and die were set at 400°F., 400°F. 420°F. (from barrel to die). The strands were chopped in a rotary chopper to ⅛ inch lengths. In the use of additives, phenoxy resin, free of epoxide groups, prepared from 2,2-bis(4-hydroxyphenyl) propane and epichlorohydrin having a number average molecular weight in the range from 27,000 to 29,000 can be added in the tumble blender or in the extrusion blender. The diepoxide of reaction product of 2,2-bis(4-hydroxyphenyl) propane and epichlorohydrin having a number average molecular weight in the range from 8,000 to 12,000 can be added in the identical places as the phenoxy resin. Reference to the diepoxide is hereinafter described as epoxy.

The various materials were molded into tensile test bars under the following conditions:

| | |
|---|---|
| Processing Temperature | 400°F. |
| Mold Temperature | 220°F. |
| Screw Speed | 80 rpm. |
| Total Cycle Time | 55 seconds |

The results in Table I utilize 25 weight percent glass fibers (⅛ inch length) intimately mixed with polyoxymethylene copolymer (ethylene oxide) in the presence of various amounts of additives such as phenoxy resin and epoxy.

weight of at least 10,000 and a melting point of at least 150°C.; reinforcing agents intimately mixed with said polymer; and from about 0.1 to about 8 weight percent of a thermoplastic phenoxy resin having a repeating structure:

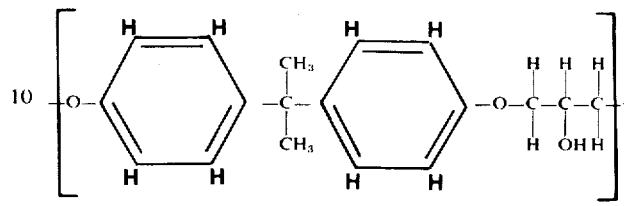

and an average molecular weight range from about 15,000 to about 75,000.

2. The product of claim 1 wherein the amount of reinforcing agent ranges from about 5 to about 60 weight percent of the total thermoplastic molding resin.

3. The product of claim 2 wherein the reinforcing agents are glass fibers.

4. The product of claim 2 wherein the reinforcing agent is acicular calcium metasilicate.

TABLE I

Comparative Properties of 25% Glass Reinforced Polyoxymethylene Copolymer with Phenoxy Resin and Epoxy Additives

| Amount of Additive (wt. % of total composition) | None | 0.5% | | 1% | | 1.5% | | 2% | |
|---|---|---|---|---|---|---|---|---|---|
| Type of Additive | None | Phenoxy | Epoxy | Phenoxy | Epoxy | Phenoxy | Epoxy | Phenoxy | Epoxy |
| Tensile Strength, psi | 10,050 | 16,520 | 15,610 | 17,205 | 14,740 | 16,445 | 14,452 | 17,100 | 13,930 |
| Elongation % | 1.5 | 2.4 | 2.4 | 1.9 | 2.2 | 2.5 | 2.9 | 2.3 | 2.3 |
| Energy to Break in-lb | 28.9 | 78.2 | 65.0 | 85.8 | 56.3 | 75.1 | 56.1 | 81.0 | 48.0 |
| Flexural Strength, psi | — | 29,192 | 21,362 | 23,964 | 20,325 | 22,911 | 20,337 | 23,547 | 18,781 |
| Flexural Modulus × 10⁶, psi | — | 0.984 | 0.943 | 0.995 | 0.931 | 0.988 | 0.957 | 0.982 | 0.927 |
| Notched Izod, ft/lbs notch | 1.02 | 1.29 | 1.19 | 1.46 | 1.11 | 1.38 | 1.15 | 1.43 | 1.09 |
| ½ lb. Gardner Impact in-lb | 2.12 | 2.25 | 2.25 | 3.12 | 2.12 | 2.87 | 2.25 | 2.62 | 1.75 |

The comparative results of Table I indicate that the presence of phenoxy resin and epoxy resin provide vastly improved physical properties over the control containing no additives. The presence of phenoxy resin, however, provides significant improvements over the epoxy resin in tensile strength, flexural strength, impact, among other properties. This is indeed surprising considering that the phenoxy resin does not appear to have reactive groups such as the epoxy resins do. It is further surprising that the phenoxy resin additive, known as an adhesive, is compatible with the reinforced polyoxymethylene copolymer and providing outstandingly smooth surface effects when compared with the control (no additive) sample.

Similar outstanding results as above with the phenoxy resin are obtained when the phenoxy resin is incorporated onto the reinforcing agent prior to the intimate mixing of the reinforcing agent and the polyoxymethylene homopolymer or copolymer.

What is claimed is:

1. An improved thermoplastic molding resin comprising a normally solid oxymethylene polymer having an inherent viscosity of at least 1.0 (measured at 60°C. in a 0.1 weight percent solution in p-chlorophenol containing 2 weight percent of alpha-pinene), a molecular 5. The product of claim 2 wherein the oxymethylene polymer is a capped homopolymer.

6. The product of claim 2 wherein said oxymethylene polymer is an oxymethylene copolymer comprising from about 85 mole percent to 99.9 mole percent recurring —OCH₂— groups.

7. The product of claim 2 wherein the amount of phenoxy resin ranges from about 0.5 to 3 weight percent of the total thermoplastic molding resin and said phenoxy resin having an average molecular weight ranging from about 20,000 to about 50,000.

8. A process for producing an improved thermoplastic molding resin wherein a normally solid oxymethylene polymer having an inherent viscosity of at least 1.0 (measured at 60°C. in a 0.1 weight percent solution in p-chlorophenol containing 2 weight percent of alpha-pinene), a molecular weight of at least 10,000, and a melting point of at least 150°C., is intimately mixed with about 5 to 60 weight percent of the total molding resin of a reinforcing agent in the presence of from about 0.1 to about 8 weight percent of the total molding resin of a thermoplastic phenoxy resin having a repeating structure

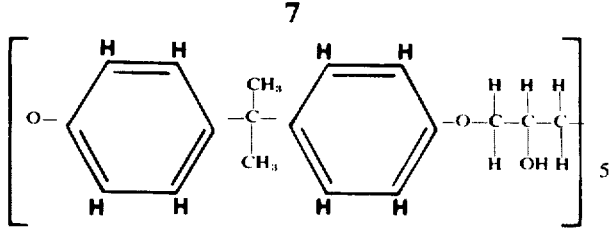
and an average molecular weight range from about 15,000 to about 75,000.
9. The process of claim 8 wherein the reinforcing agent is glass fibers.
10. The process of claim 9 wherein the thermoplastic phenoxy resin is incorporated on the reinforcing agent and then intimately mixed with the polyoxymethylene polymer.
* * * * *